United States Patent [19]
Kelly et al.

[11] Patent Number: 5,424,944
[45] Date of Patent: Jun. 13, 1995

[54] SYSTEM AND METHODS FOR CONTROLLED ASSET DISPOSITION

[75] Inventors: Regan A. Kelly, Mamaroneck; Magliato, Sr., Nicholas J., Highland; Eric O. Ronningen, New Rochelle; Anthony J. Cimini, Hawthorne; John F. DiMassimo, Lake Carmel, all of N.Y.

[73] Assignee: Asset Management & Control, Inc., West Haven, Conn.

[21] Appl. No.: 189,987

[22] Filed: Feb. 2, 1994

[51] Int. Cl.$^6$ .................................. G06F 153/00
[52] U.S. Cl. .......................... 364/401; 364/403; 364/478
[58] Field of Search ............... 364/401, 403, 478, 468

[56] References Cited

U.S. PATENT DOCUMENTS

| | | | |
|---|---|---|---|
| 4,974,166 | 11/1990 | Maney et al. | 364/478 |
| 5,025,140 | 6/1991 | Varley | 364/403 |
| 5,072,400 | 12/1991 | Manduley | 364/478 |
| 5,088,045 | 2/1992 | Shimanaka et al. | 364/468 |
| 5,093,794 | 3/1992 | Howie et al. | 364/468 |
| 5,159,548 | 10/1992 | Caslavka | 364/408 |
| 5,241,671 | 8/1993 | Reed et al. | |
| 5,243,531 | 9/1993 | DiPippo et al. | 364/468 |

*Primary Examiner*—Donald E. McElheny, Jr.
*Attorney, Agent, or Firm*—Hedman, Gibson & Costigan

[57] ABSTRACT

Disclosed is a method of controlling the disposition of an asset comprising the steps of transporting the asset from a customer facility to a disposition facility, receiving the asset at the disposition facility and creating a receipt record thereof, sorting the asset in accordance with a preselected method of disposition, and disposing of the asset in accordance with said preselected method of disposition; wherein the preselected method of disposition is one of a plurality of methods of disposition comprising: selling the asset on an as-is basis in the same condition that the asset was received at the disposition facility and creating a sale record thereof, refurbishing the asset in accordance with predetermined customer instructions and creating a refurbishment record thereof; dismantling the asset into an assembly of parts in accordance with predetermined customer instructions and creating a dismantle record thereof; dysfunctioning the asset in accordance with predetermined customer instructions and creating a dysfunction record thereof; reclaiming the asset in accordance with predetermined customer instructions and creating a reclaim record thereof; destroying the asset and creating a destruction record thereof; and storing the asset and creating an inventory record thereof. The method is carried out by a multimedia system comprising image capture means, data capture means, computing means, and multimedia devices strategically located throughout.

23 Claims, 3 Drawing Sheets

SYSTEM AND METHODS FOR CONTROLLED ASSET DISPOSITION

FIELD OF THE INVENTION

The present invention relates to a system and method for the controlled disposition of selected capital assets.

BACKGROUND OF THE INVENTION

In many industries there is a need to control the disposition of certain capital assets for various reasons. Assets may become surplus due to obsolescence or overproduction, they may need refurbishing with new parts, they may need environmentally unsound parts removed or replaced, and the like.

One method in the prior art of controlling the disposition of such assets is complete disposal, which may be accomplished through an outside source. In some instances, the obsolete product may contain subassemblies or parts which have value. For example, a computer manufacturer may introduce a new model mainframe computer and have in its stock a surplus of an older model mainframe. Although the older model mainframe is unsalable, it likely contains many usable parts, such as memory devices, display devices, and the like.

There is thus a need for managing various types of dispositions of surplus or obsolete assets. In the prior art, this may be accomplished by simply providing the surplus products to an outside source which disassembles the products. It has been found, however, that these vendors often inadvertently or fraudulently mismanage the disassembly and disposition of the surplus. For example, parts which should be kept out of the marketplace may be sold on a "black market." This results in fraudulent warranty claims to the original asset manufacturer, poor customer relations, and substantial losses in revenues to the manufacturer.

It is therefore an object of the present invention to provide a system and method for the controlled disposition of assets which overcomes the problems of the prior art.

SUMMARY OF THE INVENTION

In accordance with this and other objects, the present invention is a controlled capital asset disposition process supported by an interactive multi-media system which combines images of the assets with relevant data and audio records and disposition instructions for security and reconciliation purposes. The method of the present invention of controlling the disposition of an asset comprises the steps of transporting the asset from a customer facility to a disposition facility, receiving the asset at the disposition facility and creating a receipt record thereof, sorting the asset in accordance with a preselected method of disposition, and disposing of the asset in accordance with the preselected method of disposition. In the present invention, the method of disposition which is preselected may be one or any desired combination of certain options, which options include selling the asset on an as-is basis in the same condition that the asset was received at the disposition facility and creating a sale record thereof, refurbishing the asset in accordance with predetermined customer instructions and creating a refurbishment record thereof, dismantling the asset into an assembly of parts in accordance with predetermined customer instructions and creating a dismantle record thereof, dysfunctioning the asset in accordance with predetermined customer instructions and creating a dysfunction record thereof, reclaiming the asset in accordance with predetermined customer instructions and creating a reclaim record thereof, destroying the asset and creating a destruction record thereof, or storing the asset and creating an inventory record thereof.

The major processes supported by the present invention are the transport process, the receipt process, the sort process, the disposition process, and the certification or verification process.

In accordance with the present invention, the asset to be disposed of is first prepared for transport to the disposition facility. The disposition service provider obtains from the customer an asset record containing pertinent information regarding the asset such as the machine type, model number, serial number or other unique company identifier. In the alternative, the service provider creates an asset record at the customer facility using portable computer means (e.g. a laptop computer). In either case, a unique asset identifier code is assigned by the service provider for continuous tracking and accountability throughout the disposition process. The asset is loaded onto the transporting vehicle, and the vehicle is sealed with a unique sealing device and witnessed by the customer. The service provider creates an image record of the asset that is linked to the unique sealing image with the appropriate transport date.

The receipt process is initiated upon arrival at the service provider's disposition facility. The transport seal is removed, and an image and data record is created in the same fashion as that created at the transport station. The vehicle receipt content data is reconciled with the transport data record to ensure that the asset shipment has not been tampered with.

During the sort process, the asset is routed to the appropriate disposition station (as-is sale, refurbish, dismantle, dysfunction, reclaim, destruct, or storage) in accordance with the customer's instructions. The asset and/or its component parts may be routed to more than one station in accordance with the particular requirements of the customer. For example, a customer may wish to have a computer disassembled and then have a certain part dysfunctioned and destroyed, a certain part refurbished and sold, and a certain part stored in inventory. The asset would be routed first to the dismantle station, and the component parts would be routed to the appropriate disposition station as required.

Thus, during the disposition process, there are several alternative actions which may be taken, depending on the requirements of the customer. The first option is an as-is sale, for which the service provider creates a marketing record of the asset to be used in an electronic bidding process. This process consists of creating an electronic image/data record for distribution to potential buyers on a predetermined mailing list. The service provider also creates this same record for the customer and adds the expected financial return data based on the service provider's data base of prior sales and returns. This creates for the customer the initialization of its financial control process. Upon sale of the asset, the service provider creates a financial record tied to the initial identifier assigned in the receipt process to complete the management and control process.

For the refurbish option of the disposition process, the customer can instruct the service provider to refurbish an asset or a component part in any desired manner.

For example, a customer may wish to replace a computer memory chip with a newer model having a faster access time. An image, data and audio instruction sequence will be displayed to a worker at the refurbish station which guides the worker in the steps necessary to carry out this process.

For the dismantle option of the disposition process, the service provider creates the asset disassembly process, which is on-line to assist the person disassembling the asset. When signing onto the disassembly system, a secure data record is created to identify the worker responsible for disassembly. The disassembly system does not automatically continue until certain required data is entered by operator. The disassembly image provided to the worker is dynamic and demonstrates the total disassembly of a unit or the removal of a specific part or component within the unit. A physical disassembly line is created in support of the designated process. Once disassembled, the disposition of the asset parts would be designated by the system.

For the dysfunction option of the disposition process, the customer can instruct the service provider to dysfunction (render useless) an asset or a component part in any desired manner. For example, a customer may wish to dysfunction a circuit board by having a worker clip off the leads which are used to interface the board with an associated socket. As with the dismantle and refurbish options, an image, data and audio instruction sequence will be displayed to a worker at the dysfunction station which guides the worker in the steps necessary to carry out this process.

For the reclaim option of the disposition process, the customer can instruct the service provider to reclaim certain valuable components or materials of the asset. For example, a customer may wish to reclaim the metal used for housing a computer by melting down the housing and selling it in the appropriate market. As with the dismantle, refurbish and dysfunction options, an image, data and audio instruction sequence will be displayed to a worker at the reclaim station which guides the worker in the steps necessary to carry out this process. The system identifies any components containing hazardous material. The system contains an environmentally sound process for disposal.

For the destroy option of the disposition process, the asset or component part is destroyed (e.g. by crushing) and an image/data verification record is created for archival purposes.

For the storage and inventory option of the disposition process, the service provider creates an image/data inventory record for customer access and inventory management by the service provider. Upon customer request, the service provider executes subsequent disposition and updates the database. Periodic reconciliation of the Inventory portion of the database is an automated system process.

A redundant database is provided which is accessible by only the customer. All records input to the system database are simultaneously input to the customer database. Thus, both the service provider and the customer have independent proof of the specific actions undertaken by the service provider should a dispute arise between the parties.

After disposition, the asset, component parts and/or reclaimed materials may be sold in the appropriate market to a purchaser, returned to the customer, or stored on-site for subsequent disposition.

The final process employed by the present invention is the certification process, wherein the service provider creates image/data records of the actions taken on the asset or component parts. This verification image/data data base is maintained on line for or designated period or archived off line on CD-ROM or other mass storage means with a supporting library system.

DESCRIPTION OF THE PREFERRED EMBODIMENT

Figure 1A:
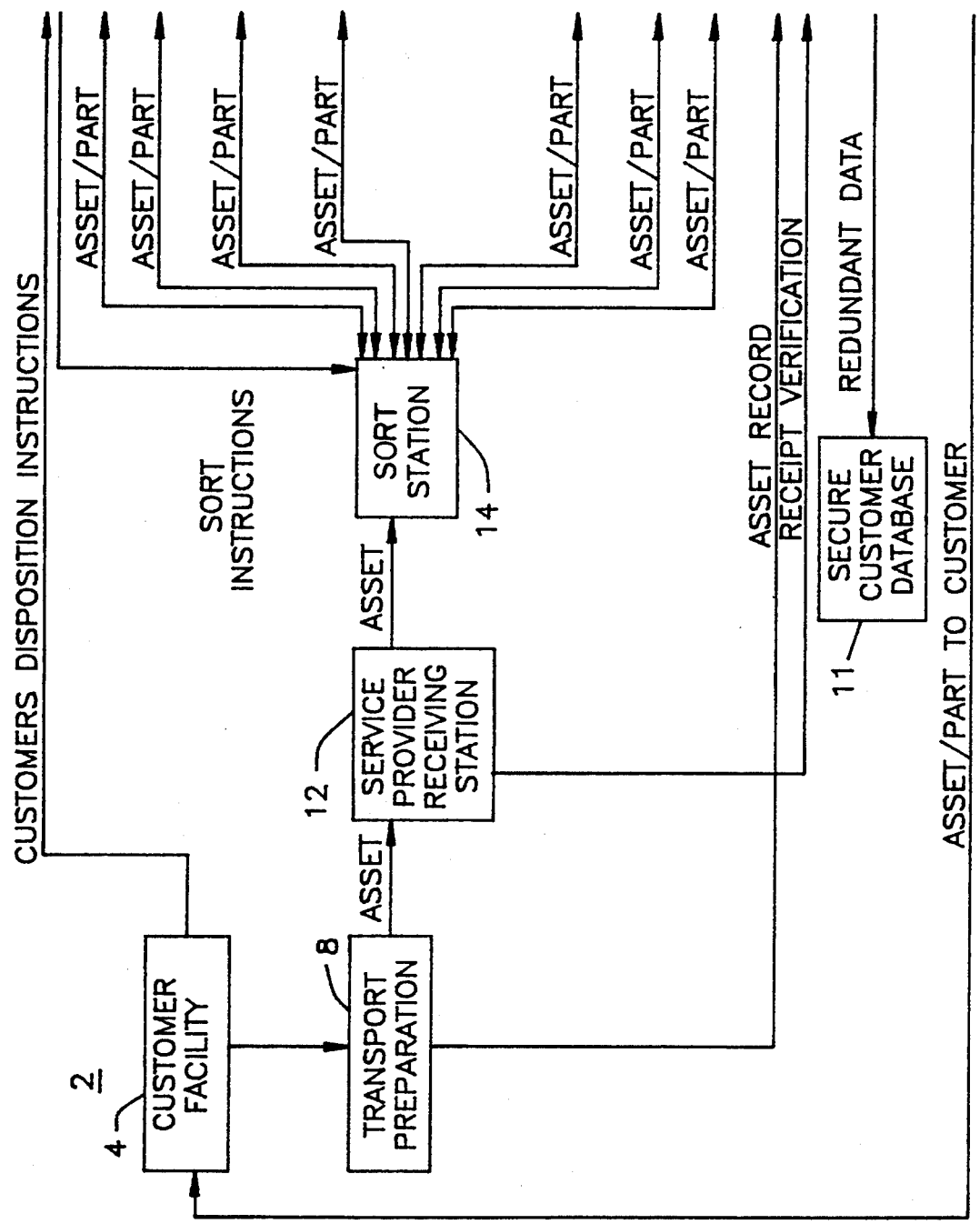
FIG. 1 is a functional block diagram of the preferred embodiment of the present invention.
Figure 1B:
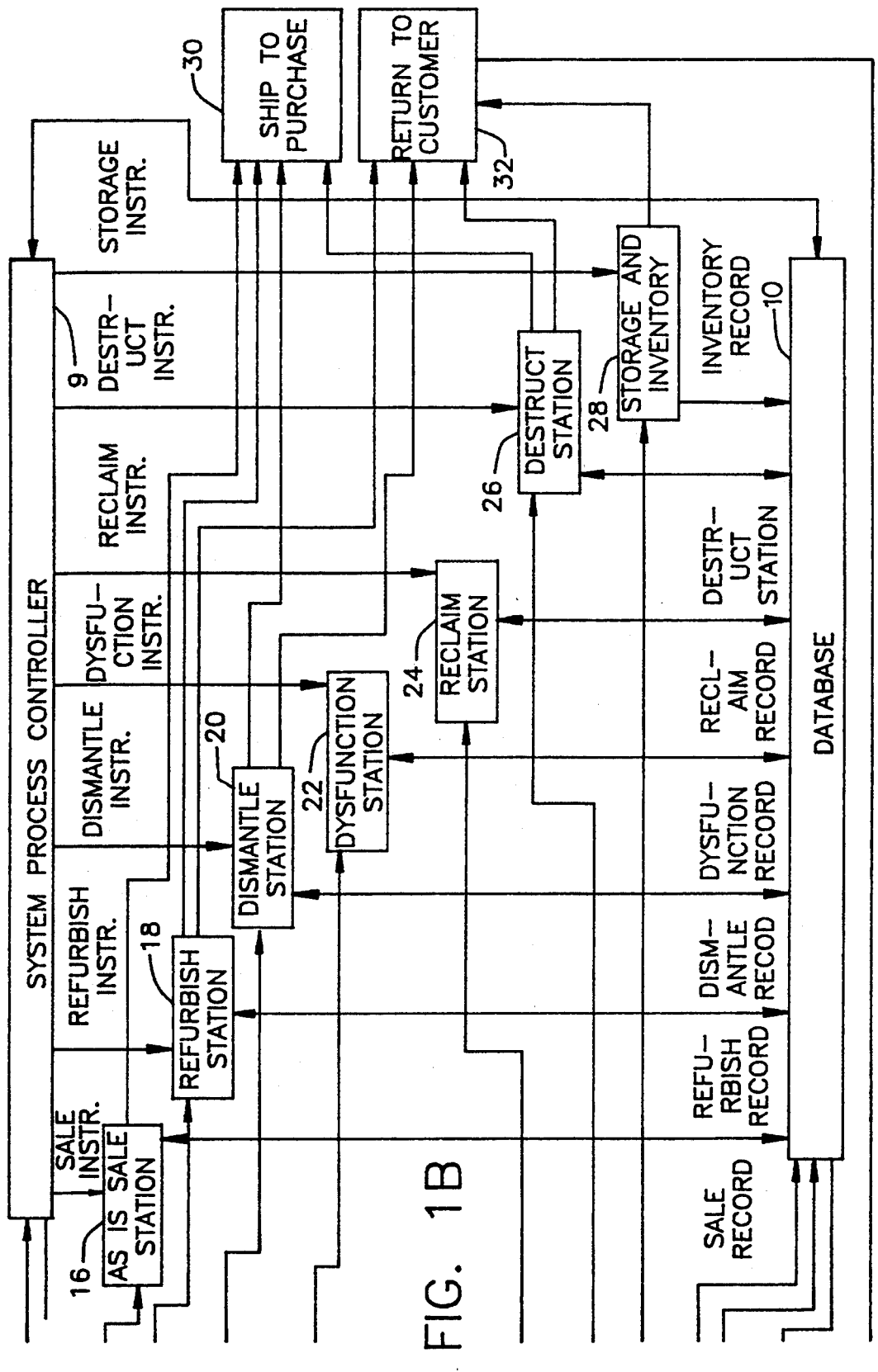

The preferred embodiment of the method and system of the present invention will now be described in detail with reference to the accompanying Figures. In particular, FIG. 1 is a functional block diagram of the preferred embodiment of the controlled asset management system 2 of the present invention. An asset to be disposed of is initially located at a customer facility 4 and is first prepared for transport to the disposition facility at a transport preparation station 8, which is located at or proximate the customer facility 4.

At the transport preparation station 8, the asset is loaded onto a transport vehicle such as an airplane, locomotive train, or truck. The transport vehicle is sealed by means known in the art in order to guard against tampering with or theft of the asset during transport, and a transport record is created.

Figure 2:
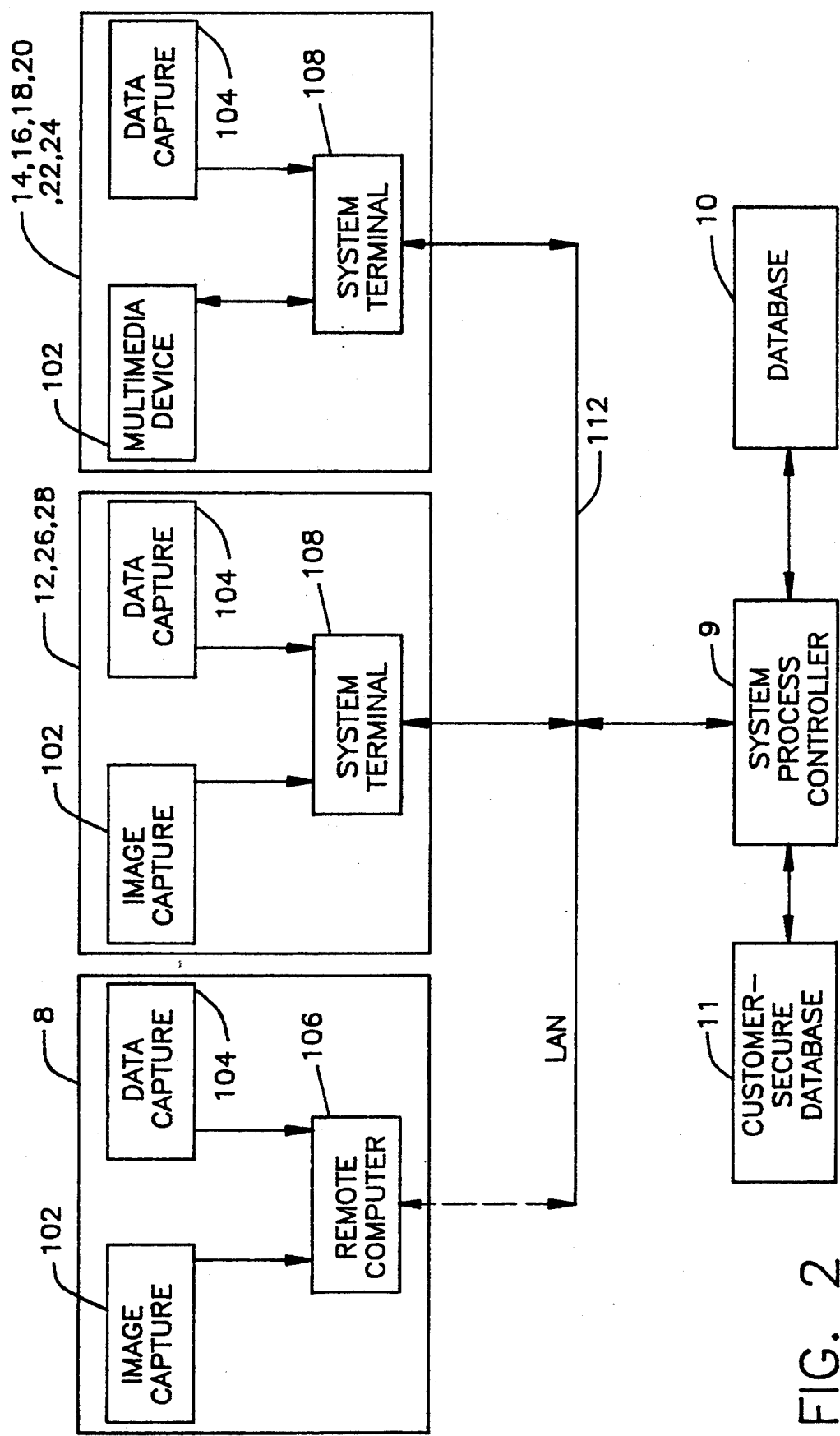
FIG. 2 is a schematic diagram of the system of FIG. 1.

As shown in further detail in the schematic block diagram of FIG. 2, the transport preparation station 8 comprises an image capture device 102 and a data capture device 104 coupled as inputs to a remote computer 106. The image capture device 102 in the preferred embodiment is a digital camera, but may also be any means to capture an image of the asset prior to transport. The data capture device 104 is a keyboard in the preferred embodiment for manual entry of data, but may also be a bar code scanner or the like. The remote computer 106 is preferably a laptop computer, but may also be a stand-alone PC or the like.

The transport record captured by the transport preparation station 8 in the preferred embodiment comprises data regarding the asset such as the customer name, asset model and serial number, and other information such as description or other unique company identifier. This data is manually entered via the data capture means 104 or may be embedded in a bar code and scanned in automatically. In addition, an image record of the asset is obtained by using the image capture means 102. The combination image/data transport record is then loaded into the database 10 via the system process controller 9 at the disposition facility 6 for subsequent reconciliation purposes.

The image/data record may be generated by the customer and provided to the service provider for input into the database 10, or it may be generated by the service provider at the customer's site as described above.

After arrival at the disposition facility, the transport vehicle is unsealed at the asset receiving station 12 under supervision of the appropriate personnel of the disposition service provider. The receiving station 12 comprises the equivalent image capture device 102 and data capture device 104 as the transport preparation station 8, which are coupled to a system terminal 108. The system terminal 108 is coupled to the system process controller 9 via a local area network (LAN) 112.

An image and data receipt record of the unsealing of the asset is generated in the same fashion as was the transport record, i.e. by using the image capture means 102 to obtain an image record and by inputting the appropriate data via the data capture means 104, and is loaded into the database 10. The transport and receipt image/data records can be reconciled at that or any subsequent time by the service provider by accessing the records from the database 10 and comparing them by means of system process controller 9. This process ensures that the asset was not stolen or otherwise tampered with during transport.

After confirmation that the asset has been validly transported, the asset is routed to a sort station 14. The sort station 14 comprises an additional system terminal 108 coupled to the system process controller 9 via the LAN 112. An interactive multimedia device 110 and a data capture device 104 are coupled to the system terminal 108. The multimedia device 110 comprises a touch screen monitor and provides image, text and/or audio instructions to the user and accepts touch screen inputs as desired. In the preferred embodiment, the multimedia device 110 is an APPLE MACINTOSH QUADRA 800 computer.

Disposition facility personnel operate the sort station 14 in accordance with instructions previously provided by the customer regarding the desired manner of disposition of the asset, which instructions are displayed on the multimedia device 110. In the preferred embodiment, the asset may be initially routed to an as-is sale station 16, a refurbish station 18, a dismantle station 20, a dysfunction station 22, a reclaim station 24, a destruct station 26, or a storage station 28.

At the as-is sale station 16, the asset is prepared for sale in the same, or "as-is", condition as which it was received at the disposition facility 6. The as-is sale station 16 comprises an additional system terminal 108 coupled to the system process controller 9 via the LAN 112. An interactive multimedia device 110 and a data capture device 104 are coupled to the system terminal 108. The multimedia device 110 comprises a touch screen monitor and provides image, text and/or audio instructions to the user and accepts touch screen inputs as desired.

The service provider creates a marketing record of the asset, which consists of pertinent data such as the asset type, model, serial number, size, color, age, condition, etc. The sale is advertised to potential buyers in accordance with an industry-based mailing list, which is provided by the customer or outside source. The image/data record previously created is used for distribution to the potential buyers, and an auction or other type of sale of the product is carried out accordingly. After sale, the asset is shipped to the purchaser by means of station 30.

At the refurbish station 18, the asset is refurbished in accordance with predetermined customer instructions. The refurbish station 18 comprises an additional system terminal 108 coupled to the system process controller 9 via the LAN 112. An interactive multimedia device 110 and a data capture device 104 are coupled to the system terminal 108. The multimedia device 110 comprises a touch screen monitor and provides image, text and/or audio instructions to the user and accepts touch screen inputs as desired.

An electronic image, which may be dynamic, of the refurbishment process is displayed on the monitor on a step-by-step basis. The refurbishment process may be an assembly line if the number of assets to be refurbished in a similar way is large enough. Personnel using the multimedia device 110 will activate a predetermined set of refurbishing instructions that are unique to the scope of work required at that physical refurbish line station. For example, the customer may want the service provider to refurbish a computer circuit board by removing an obsolete memory chip and replacing it with a newer one. The video monitor will illustrate to the worker, step-by-step, this process; a first screen shows the original circuit board, a second screen tells the worker which part to remove and how to remove it, and a third screen shows a worker how to insert the new part. The video display—image and text—may be embellished with audio instructions in the multimedia environment. In addition, worker verification of each step may be implemented by requiring the worker to input certain data into the system as desired.

After refurbishment, the asset may be further disposed of by storage, sale to a purchaser, or return to the customer. The system process controller 9 instructs the worker as to final disposition by fetching the proper instructions from the database 10.

The asset may alternatively be routed by the sort station 14 to the dismantle station 20. The dismantle station 20 comprises an additional system terminal 108 coupled to the system process controller 9 via the LAN 112. An interactive multimedia device 110 and a data capture device 104 are coupled to the system terminal 108. The multimedia device 110 comprises a touch screen monitor and provides image, text and/or audio instructions to the user and accepts touch screen inputs as desired.

The asset is dismantled in a controlled fashion by a worker under the guidance of image-based instruction displayed on the multimedia device 110. The asset may be dismantled for any number of reasons—a certain part may be removed and stored, returned to the customer, or sold on the open market. An environmentally-sensitive part (e.g. a mercury switch) may need to be removed in order to be disposed of in an environmentally-controlled way. A record of the action taken is created for storing in the database 10; the record consists of the same image and relevant data as well as the action taken on the asset by the operator. Thus, the customer will have access to the disposition records of the asset and the service provider will be able to provide full accountability of the steps taken in dismantling the asset as well as subsequent disposition of the component parts. After the asset is dismantled, the component parts may be further disposed of by rerouting by the sort station 14 to any of the other disposition stations as desired.

The asset may be routed by the sort station 14 to the dysfunction station 22. The dysfunction station 22 comprises an additional system terminal 108 coupled to the system process controller 9 via the LAN 112. An interactive multimedia device 110 and a data capture device 104 are coupled to the system terminal 108. The multimedia device 110 comprises a touch screen monitor and provides image, text and/or audio instructions to the user and accepts touch screen inputs as desired. The asset is dysfunctioned in a controlled fashion by a worker under the guidance of image-based instruction displayed on the multimedia device 110. By way of example, a customer may wish to dysfunction a circuit board by having a worker clip off the leads which are used to interface the board with an associated socket. As with the dismantle and refurbish options, an image, data and audio instruction sequence will be displayed on the multimedia device 110 to a worker at the dysfunction station 22 which guides the worker in the steps necessary to carry out this process.

The asset may be routed by the sort station 14 to the reclaim station 24. The reclaim station 24 comprises an additional system terminal 108 coupled to the system process controller 9 via the LAN 112. An interactive multimedia device 110 and a data capture device 104 are coupled to the system terminal 108. The multimedia device 110 comprises a touch screen monitor and provides image, text and/or audio instructions to the user and accepts touch screen inputs as desired. The asset or component part is reclaimed by a worker under the guidance of image-based instruction displayed on the multimedia device 110. For example, a customer may wish to reclaim the metal used for housing a computer by melting down the housing and selling it in the appropriate market. An image, data and audio instruction sequence will be displayed on the multimedia device 110 to a worker at the reclaim station 24 which guides the worker in the steps necessary to carry out this process.

Another option the customer has is for the asset to be routed to the destruct station 26. If the customer has deemed that there is no benefit (economic or other) in selling or storing some or part of the asset, then it may instruct the disposition service provider to simply destroy the asset. The destruct station 26 comprises an image capture device 102 and a data capture device 104 which are coupled to a system terminal 108. The system terminal 108 is coupled to the system process controller 9 via the LAN 112. A record of the asset destruct process is created for customer verification purposes by creating an image of the part with the unique customer identifier in either a dynamic destruct process and/or a final destruct state.

Finally, the asset may be routed by the sort station 14 to the storage station 28. The storage station 28 comprises an image capture device 102 and a data capture device 104 which are coupled to a system terminal 108. The system terminal 108 is coupled to the system process controller 9 via the LAN 112. At the storage station 28, an asset (or a part dismantled at the dismantle station 20) may be put in storage if desired by the customer, and a record is created consisting of an image of the stored item as well as relevant data. This record is stored in the database 10 for verification purposes by the customer.

In addition to storing relevant image/data records in the database 10, the image/data records are redundantly stored in a secure customer database 11 which is coupled to the system. Only the customer has access to his or her portion of the secure customer database 11, and only the service provider has access to the database 10. If a question arises as to the disposition of an asset, the databases 10, 11 can be compared and the customer is assured that the records in the secure customer database 11 are an accurate indication of the dispositions which have occurred.

The database in the preferred embodiment is generated by using the CLARIS FILEMAKER PRO software package, which is configured to store pertinent information regarding the assets as desired; e.g. product type, company name, serial number, size, color, etc. Any database software capable of storing records appropriate to the specific needs of the user may, however, be implemented.

An asset may be put through multiple dispositions as desired. For example, a company may desire to dispose of a computer by the dismantle, dysfunction and reclaim processes as follows:

The computer is disposed of by creating a detailed set of image and data instructions that are conveyed to operational personnel using a multimedia device 110. The operator will sign onto the system with a unique code to initialize the system. The time and date stamp will automatically be assigned by the system. The system will not progress until required data is input by the operator at the initial station. The required data is a unique customer identifier such as machine type, model number, serial number or an identifier assigned by the service provider. This input data will initialized the required set of instructions to invoke the customer-determined business process (the customer has the only access to this secure part of the program). In this case, the customer has determined that it wants to pursue the secure, environmentally sound, most economic disposition of the asset. The system would then convey to the operator the dismantle instructions which could be either a complete disassembly or the removal of a specific sensitive part or component within the asset. Once removed, the operator will input any required data to have the system proceed; for example, the customer-assigned part number of the part or component. The system will then invoke the predetermined sort process for the disposition of the part or component. When received at the assigned operational station, the operator signs onto the system with a unique code and enters the required data such as the part number and serial number. The system instructs the operator on the specific tasks required to dysfunction the part; for example to remove the attachment leads of a circuit board. The system identifies those components on the part that are to be reclaimed. The instructions would be in both image and data. The system also identifies any hazardous components or materials and instructs the operator on their environmentally sound removal and disposal. An image of the part in the dysfunctional state with reclaimed parts and hazardous materials removed is then created. This image/data record would be the customer's verification/certification that the asset was disposed of in accordance with its instructions. This data record is archived for future customer access. A system record is created which identifies the type and quantity of removed components along with the expected return. This will invoke the inventory control, marketing and financial control portions of the system.

Inventory control is accomplished by providing customer access to the system inventory data. The customer then requests other stratified or periodic inventory reconciliations. An example of stratified inventory is to count a specific part number. Periodic inventory is all parts on a scheduled basis; i.e. monthly, quarterly or annually.

Marketing control is accomplished by creating an image/data record and distributing to potential buyers on a predetermined basis by either system access of distribution electronically or CD ROM, etc.

Financial control is accomplished by providing customer anticipated sale price data based on historical data contained in the system data base. The data is at the asset, part or unique tracking level (an example of unique tracking is by truckload). The customer and service provider have the ability to reconcile any variance between the anticipated return and the actual return.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the appended claims.

We claim:

1. A method for verifiably controlling the disposition of an asset, said method comprising the steps of:
   (a) creating an asset record uniquely associated with said asset;
   (b) securely sealing said asset in a tamper-proof transport means;
   (c) creating a transport record associating said asset with said tamper-proof transport means;
   (d) transporting said asset from a customer facility to a disposition facility;
   (e) unsealing said asset from within said tamper-proof transport means;
   (f) creating a receipt record associating said asset with said tamper-proof transport means, said receipt record being reconcilable with said transport record;
   (g) sorting said asset in accordance with a preselected method of disposition; and
   (h) disposing of said asset in accordance with said preselected method of disposition and creating a disposition record uniquely associated with said asset to be maintained for customer verification.

2. A method for verifiably controlling the disposition of an asset, said method comprising the steps of:
   (a) creating an asset record uniquely associated with said asset;
   (b) securely sealing said asset in a tamper-proof transport means;
   (c) creating a transport record associating said asset with said tamper-proof transport means;
   (d) transporting said asset from a customer facility to a disposition facility;
   (e) unsealing said asset from within said tamper-proof transport means;
   (f) creating a receipt record associating said asset with said tamper-proof transport means, said receipt record being reconcilable with said transport record;
   (g) sorting said asset in accordance with a preselected method of disposition;
   (h) disposing of said asset in accordance with said preselected method of disposition and creating a disposition record uniquely associated with said asset to be maintained for customer verification; and
   (i) storing said transport record, said receipt record and said disposition record in a database, said database being coupled to a system process controller, said system process controller being coupled to a communications network.

3. The method of claim 2 further comprising the step of storing said transport record, said receipt record and said disposition record in a redundant database accessible only by a customer, said redundant database being coupled to said system process controller.

4. The method of claim 2 wherein the step of creating said transport record is comprised of the steps of:
   (a) obtaining a transport image record of the secure sealing of said asset in said tamper-proof transport means;
   (b) associating said transport image record with said asset record; and
   (c) transmitting said transport record to said system process controller via said communications network for storage in said database.

5. The method of claim 2 wherein the step of creating said receipt record is comprised of the steps of:
   (a) creating a receipt image record of the unsealing of said asset from within said tamper-proof transport means;
   (b) associating said receipt image record with said asset record; and
   (c) transmitting said receipt record to said system process controller via said communications network for storage in said database.

6. The method of claim 2 wherein said sorting step comprises communicating said preselected method of disposition to an operator via a multimedia device, said multimedia device being coupled to a system terminal which is in communication with said system process controller via said communication network.

7. The method of claim 2 wherein the step of disposing of said asset in accordance with said preselected method of disposition is comprised of the steps of:
   (a) creating a marketing record pertaining to said asset;
   (b) selling said asset in as-is condition;
   (c) creating a sale record of said sale; and
   (d) transmitting said marketing record and said sales record to said system process controller via said communications network for storage in said database.

8. The method of claim 2 wherein the step of disposing of said asset in accordance with said preselected method of disposition is comprised of the steps of:
   (a) refurbishing said asset in accordance with said predetermined customer instructions;
   (b) creating a refurbishment record uniquely associated with said asset; and
   (c) transmitting said refurbishment record to said system process controller via said communications network for storage in said database.

9. The method of claim 2 wherein the step of disposing of said asset in accordance with said preselected method of disposition is comprised of the steps of:
   (a) dismantling said asset in accordance with said predetermined customer instructions;
   (b) creating a dismantle record uniquely associated with said asset; and
   (c) transmitting said dismantle record to said system process controller via said communications network for storage in said database.

10. The method of claim 2 wherein the step of disposing of said asset in accordance with said preselected method of disposition is comprised of the steps of:
    (a) dysfunctioning said asset in accordance with said predetermined customer instructions;
    (b) creating a dysfunction record uniquely associated with said asset; and (c) transmitting said dysfunction record to said system process controller via said communications network for storage in said database.

11. The method of claim 2 wherein the step of disposing of said asset in accordance with said preselected method of disposition is comprised of the steps of:
(a) reclaiming said asset in accordance with said predetermined customer instructions;
(b) creating a reclaim record uniquely associated with said asset; and
(c) transmitting said reclaim record to said system process controller via said communications network for storage in said database.

12. The method of claim 2 wherein the step of disposing of said asset in accordance with said preselected method of disposition is further comprised of the step of communicating predetermined customer instructions to an operator via an interactive multimedia device, said multimedia device being coupled to a system terminal which is in communication with said system process controller via said communication network.

13. The method of claim 2 wherein the step of disposing of said asset in accordance with said preselected method of disposition is comprised of the steps of:
(a) destroying said asset in accordance with predetermined customer instructions;
(b) creating a destruct image record of said asset;
(c) creating a destruct record associating said destruct image record with said asset record; and
(d) transmitting said destruct record to said system process controller via said communications network for storage in said database.

14. The method of claim 2 wherein the step of disposing of said asset in accordance with said preselected method of disposition is comprised of the steps of:
(a) creating an inventory image record of said asset;
(b) storing said asset in accordance with predetermined customer instructions;
(c) creating an inventory record associating said inventory image record with said asset record; and
(d) transmitting said inventory record to said system process controller via said communications network for storage in said database.

15. A system for verifiably controlling the disposition of an asset, said system comprising:
(a) a tamper-proof transport means for securely sealing said asset for transport from a customer facility to a disposition facility;
(b) a transport preparation station located at or proximate to said customer facility, for creating a transport record of said asset associating said asset with said tamper-proof transport means;
(c) a receiving station located at said disposition facility for creating a receipt record of said asset associating said asset with said tamper-proof transport means, said receipt record being reconcilable with said transport record;
(d) a sorting station at said disposition facility for sorting said asset in accordance with a preselected method of disposition; and
(e) a plurality of disposition stations at said disposition facility for the disposition of said asset and for creating a disposition record uniquely associated with said asset to be maintained for customer verification.

16. A system for verifiably controlling the disposition of an asset, said system comprising:
(a) a tamper-proof transport means for securely sealing said asset for transport from a customer facility to a disposition facility;
(b) a transport preparation station located at or proximate to said customer facility, for creating a transport record of said asset associating said asset with said tamper-proof transport means;
(c) a receiving station located at said disposition facility for creating a receipt record of said asset associating said asset with said tamper-proof transport means, said receipt record being reconcilable with said transport record;
(d) a sorting station at said disposition facility for sorting said asset in accordance with a preselected method of disposition;
(e) a plurality of disposition stations at said disposition facility for the disposition of said asset and for creating a disposition record uniquely associated with said asset to be maintained for customer verification;
(f) a database for storing said transport record, said receipt record and said disposition record;
(g) a system process controller coupled to said database; and
(h) a communications network for transmitting data between said transport station, said receiving station, said sorting station, said disposition stations and said system process controller.

17. The system of claim 16 further comprising a redundant database coupled to said system process controller, said redundant database being accessible only by a customer.

18. The system of claim 16 wherein said transport preparation station is comprised of:
(a) an image capture device;
(b) a data capture device; and
(c) a remote computer coupled to said image capture device and said data capture device and capable of communicating with said system process controller via said communications network.

19. The system of claim 16 wherein said receiving station is comprised of:
(a) an image capture device;
(b) a data capture device; and
(c) a system terminal coupled to said image capture device and said data capture device and in communication with said system process controller via said communications network.

20. The system of claim 16 wherein said sorting station is comprised of:
(a) an interactive multimedia device;
(b) a data capture device; and
(c) a system terminal coupled to said interactive multimedia device and said data capture device and in communication with said system process controller via said communications network.

21. The system of claim 16 wherein at least one of said plurality of disposition stations is selected from the plurality of disposition stations comprised of:
(a) an as-is sale station for creating a marketing record and a sale record pertaining to said asset;
(b) a refurbish station for refurbishing said asset in accordance with predetermined customer instructions and creating a refurbishment record thereof;
(c) a dismantle station for dismantling said asset into an assembly of parts in accordance with predetermined customer instructions and creating a dismantle record thereof;

(d) a dysfunction station for dysfunctioning said asset in accordance with predetermined customer instructions and creating a dysfunction record thereof;

(e) a reclaim station for reclaiming said asset in accordance with predetermined customer instructions and creating a reclaim record thereof;

(f) a destruct station for destroying said asset and creating a destruct record thereof; and (g) a storage station for storing said asset and creating an inventory record thereof.

22. The system of claim 16 wherein at least one of said plurality of disposition stations is comprised of:

(a) an interactive multimedia device for communicating the predetermined customer instructions to an operator;

(b) a data capture device; and (c) a system terminal coupled to said interactive multimedia device and said data capture device and in communication with said system process controller via said communications network.

23. The system of claim 16 wherein at least one of said plurality of disposition stations is comprised of:

(a) an image capture device;

(b) a data capture device; and (c) a system terminal coupled to said image capture device and said data capture device and in communication with said system process controller via said communications network.

* * * * *

(12) POST-GRANT REVIEW CERTIFICATE (22nd)
United States Patent
Kelly et al.

(10) Number: US 5,424,944 J1
(45) Certificate Issued: May 11, 2016

(54) SYSTEM AND METHODS FOR CONTROLLED ASSET DISPOSITION

(75) Inventors: Regan A. Kelly; Nicholas J. Magliato, Sr.; Eric O. Ronningen; Anthony J. Cimini; John F. Di Massimo

(73) Assignee: DISPOSITION SERVICES LLC

Trial Number:

CBM2013-00040 filed Aug. 2, 2013

Petitioner: Dell, Inc.

Patent Owner: Disposition Services, LLC

Post-Grant Review Certificate for:

Patent No.: 5,424,944
Issued: Jun. 13, 1995
Appl. No.: 08/189,987
Filed: Feb. 2, 1994

The results of CBM2013-00040 are reflected in this post-grant review certificate under 35 U.S.C. 328(b).

POST-GRANT REVIEW CERTIFICATE
U.S. Patent 5,424,944 J1
Trial No. CBM2013-00040
Certificate Issued May 11, 2016

AS A RESULT OF THE POST-GRANT REVIEW PROCEEDING, IT HAS BEEN DETERMINED THAT:

Claims 1-6 and 8-23 are cancelled.

Claim 7 is disclaimed.

\* \* \* \* \*